UNITED STATES PATENT OFFICE.

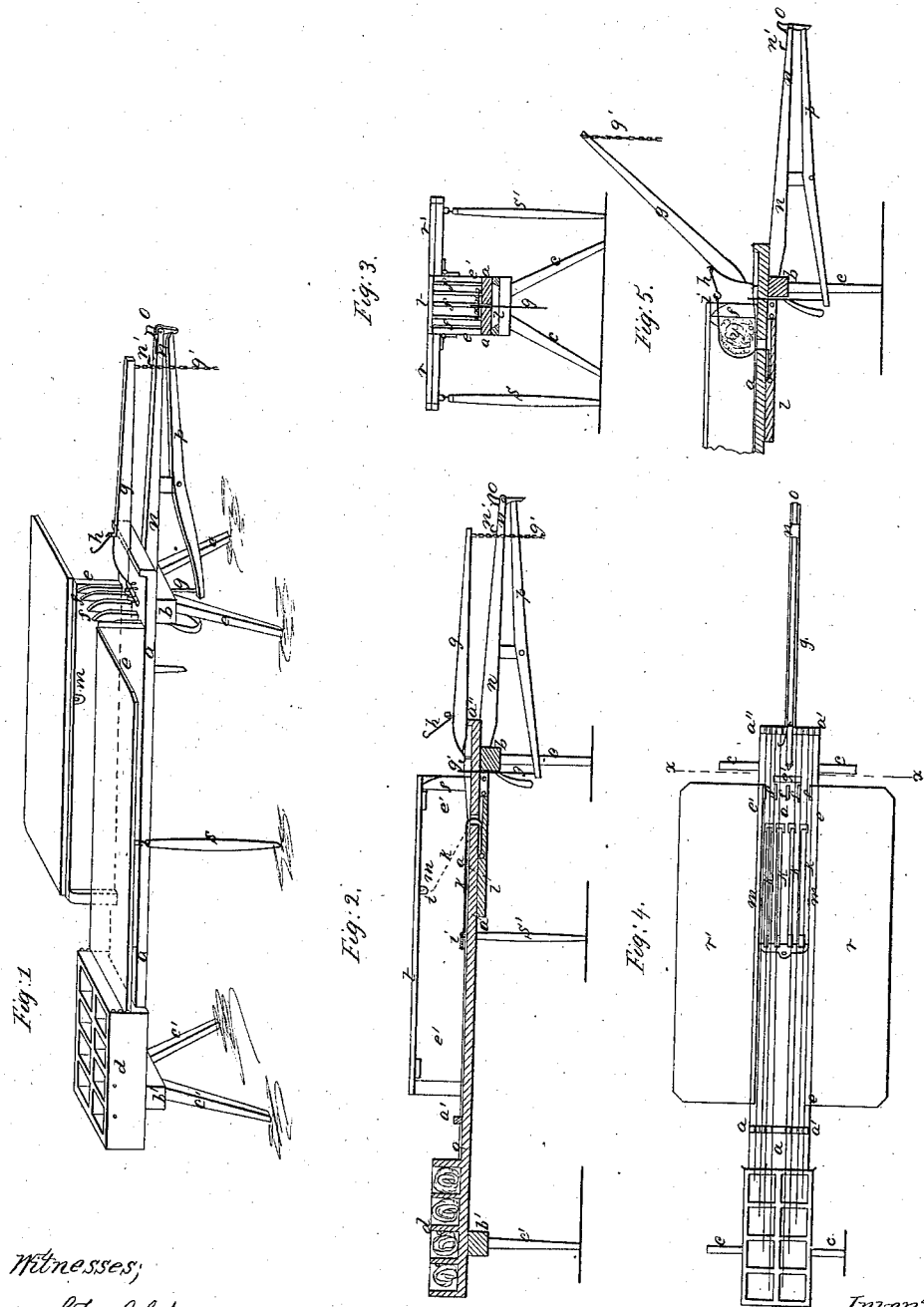

JOHN HOW, OF DEER CREEK, MICHIGAN.

MACHINE FOR BUNDLING FLEECES OF WOOL.

Specification of Letters Patent No. 12,778, dated May 1, 1855.

*To all whom it may concern:*

Be it known that I, JOHN HOW, of Deer Creek, in the county of Livingston and State of Michigan, have invented certain new and useful Improvements in Machines for Baling the Fleeces of Wool as they Come from the Animal; and I do hereby declare the following to be a full, clear, and exact description of the same, reference being had to the accompanying drawings, making a part thereof, in which—

Figure 1, represents a perspective view. Fig. 2, represents a longitudinal vertical section. Fig. 3, represents a transverse section near the end. Fig. 4, represents a top plan, and Fig. 5, represents a broken sectional side view with the bale of wool under pressure.

Similar letters in the several figures denote like parts.

It is important to preserve fleeces of wool entire as they come from the animal, so that the various qualities in the fleece, may be readily assorted out, previous to being manufactured, which cannot be easily done if the fleeces are promiscuously mixed and transported in bulk or in large bales as heretofore done.

The nature of my invention relates to a simple, expeditious, and effective machine for baling fleeces and to enable others skilled in the art to make and use my invention, I will proceed to describe the same with reference to the drawings.

I make an oblong box, the bottom of which is shown at $a$, the sides at $e$, $e'$, and the top at $t$. This box is supported on cross pieces $b$, furnished with legs $c$, $c'$, and is furnished with doors $r$, $r'$, hung to the sides $e$, $e'$, which doors when thrown back and supported by the struts $s$ $s'$, form a table on which the fleeces are placed to be rolled or folded previous to be being pressed up and baled.

On the rear end of the machine are placed any convenient number of twine boxes $d$, into which the balls of twine for tying up the bales are placed, the ends of this twine are passed through the guides $a'$, thence along in the bottom of the box, and between the straps $k$, guides $f$, string raisers $q'$, and guide $a'$. The straps $k$, pass through a slot in the bottom of the box, and are made adjustable in the piece $l$, underneath the box, to adapt them to any sized bale required, and their ends within the box are fastened to a piece $i$, as seen in Figs. 2, 4.

$m$, are supports on the sides into which the piece $i$, is placed previous to arranging the strings or twine.

After the fleece or fleeces are carefully rolled on the tables, or a board which lies over the top of the box, and the edges neatly turned or folded in, they are laid in the front part of the box, and the piece $i$, is then raised, carried forward, and by means of the hook $h$, secured to the lever $g$. The lever $g$, is then brought down, and fastened by the chain $g'$, to a hook $n'$ on the arm $n$, which holds the fleece in press. A hinged lever $p$, is hung underneath the arm $n$, one end of which is held by a spring catch $o$, and the other end of which carries a series of upright string carriers $q'$, which are provided with dead eyes, notches or recesses, through or over which the strings pass, as before described. The bale of fleeces, being held under pressure the lever $p$, is let go from the spring catch $o$, which allows that end of it to drop down, raising up the other end and with it the string carriers and strings, when the strings are taken one at a time and tied around the bale. They are then cut off and the bale removed, and the machine then prepared for another charge of fleeces.

As this machine can only be used for a very short period in each year, it is so constructed as to be easily taken to pieces to be stowed away or transported from place to place. Its main value is to wool growers, as it prepares the wool in a much more merchantable manner than heretofore done, and thus adds to its value, while by keeping the fleeces entire it facilitates the assorting of it, as is done before it is manufactured.

Having thus fully described the nature of my invention what I claim therein as new, and desire to secure by Letters Patent, is—

In combination with the packing box, the adjustable straps $k$, with their pieces $i$, and the levers $g$, and $p$, for pressing the bale, and furnishing in a convenient position for the operator, the strings or cords by which the pressed fleeces are baled up, substantially as described.

JOHN HOW.

Witnesses:
JOHN G. GIBSON,
DAVID DICKSON.